US011645073B2

(12) United States Patent
Kalamatianos et al.

(10) Patent No.: US 11,645,073 B2
(45) Date of Patent: *May 9, 2023

(54) ADDRESS-BASED FILTERING FOR LOAD/STORE SPECULATION

(71) Applicant: ADVANCED MICRO DEVICES, INC., Santa Clara, CA (US)

(72) Inventors: John Kalamatianos, Boxborough, MA (US); Krishnan V. Ramani, Santa Clara, CA (US); Susumu Mashimo, Fukuoka (JP)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/238,844

(22) Filed: Apr. 23, 2021

(65) Prior Publication Data
US 2021/0263740 A1 Aug. 26, 2021

Related U.S. Application Data

(63) Continuation of application No. 16/658,474, filed on Oct. 21, 2019, now Pat. No. 10,990,393.

(51) Int. Cl.
*G06F 9/38* (2018.01)
*G06F 9/30* (2018.01)
*G06F 9/35* (2018.01)

(52) U.S. Cl.
CPC ............ *G06F 9/30043* (2013.01); *G06F 9/35* (2013.01); *G06F 9/3842* (2013.01)

(58) Field of Classification Search
None
See application file for complete search history.

(56) References Cited

U.S. PATENT DOCUMENTS

| 5,625,835 A | 4/1997 | Ebcioglu et al. |
| 8,024,522 B1 | 9/2011 | Favor et al. |
| 8,521,963 B1 | 8/2013 | Miao et al. |

(Continued)

OTHER PUBLICATIONS

Agarwal et al., The Effect of Technology Scaling on Microarchitectural Structures, https://www.cs.utexas.edu/~skeckler/pubs/UTCS_tr2000_02.pdf, dated Feb. 2002, 36 pages.

(Continued)

*Primary Examiner* — Michael Sun

(57) ABSTRACT

Address-based filtering for load/store speculation includes maintaining a filtering table including table entries associated with ranges of addresses; in response to receiving an ordering check triggering transaction, querying the filtering table using a target address of the ordering check triggering transaction to determine if an instruction dependent upon the ordering check triggering transaction has previously been generated a physical address; and in response to determining that the filtering table lacks an indication that the instruction dependent upon the ordering check triggering transaction has previously been generated a physical address, bypassing a lookup operation in an ordering violation memory structure to determine whether the instruction dependent upon the ordering check triggering transaction is currently in-flight.

20 Claims, 8 Drawing Sheets

(56) References Cited

U.S. PATENT DOCUMENTS

| | | | | |
|---|---|---|---|---|
| 9,483,276 | B2* | 11/2016 | Busaba | G06F 9/3004 |
| 9,501,280 | B2 | 11/2016 | Abdallah | |
| 10,437,595 | B1* | 10/2019 | Kanapathipillai | G06F 9/3838 |
| 2003/0033510 | A1* | 2/2003 | Dice | G06F 9/3842 |
| | | | | 712/E9.05 |
| 2004/0199752 | A1 | 10/2004 | Winberg et al. | |
| 2010/0325395 | A1 | 12/2010 | Burger et al. | |
| 2018/0121203 | A1* | 5/2018 | Ishii | G06F 9/3806 |
| 2019/0205140 | A1 | 7/2019 | Grisenthwaite et al. | |

OTHER PUBLICATIONS

Amir Roth, Store Vulnerability Window (SVW): Re-Execution Filtering for Enhanced Load Optimization, 32nd International Symposium on Computer Architecture (ISCA '05), DOI: 10.1109/ISCA.2005.48, date added to IEEE Xplore: Jun. 20, 2005, 11 pages.

Baugh et al., Decomposing the Load-Store Queue by Function for Power Reduction and Scalability, IBM Journal of Research and Development, vol. 50, Issue 2.3, DOI: 10.1147/rd.502.0287, dated Mar. 2006, 9 pages.

Cain et al., Memory Ordering: A Value-Based Approach, IEEE Micro, vol. 24, Issue 6, DOI: 10/1109/MM.2004.81, dated Dec. 2004, 12 pages.

Castro et al., "DMDC: Delayed Memory Dependence Checking through Age-Based Filtering", 2006 39th Annual IEEE/ACM International Symposium on Microarchitecture (MICRO '06), IEEE, DOI: 10.1109/MICRO.2006.21, Date Added to IEEE Xplore: Dec. 26, 2006, 10 pages.

Chrysos et al., Memory Dependence Prediction using Store Sets, Proceedings. 25th Annual International Symposium on Computer Architecture (Cat. No. 98CB36235), DOI: 10.1109/ISCA.12998.694770, date added to IEEE Xplore: Aug. 6, 2002, 12 pages.

Gharachorloo et al., Two Techniques to Enhance the Performance of Memory Consistency Models, In Proceedings of the 1991 International Conference on Parallel Processing, dated Aug. 1991, 10 pages.

Haj-Yihia et al., Fine-Grain Power Breakdown of Modern Out-of-Order Cores and Its Implications on Skylake-Based Systems, ACM Transactions on Architecture and Code Optimization, vol. 13, Issue 4, DOI: 10.1145/3018112, dated Dec. 2016, 25 pages.

International Search Report and Written Opinion, PCT/US2020/056279, dated Mar. 12, 2021, 14 pages.

Moshovos et al., Streamlining Inter-operation Memory Communication via Data Dependence Prediction, Proceedings of 30th Annual International Symposium on Microarchitecture, DOI: 10.1109/MICRO.1997.645814, date added to IEEE Xplore: Aug. 6, 2002, 11 pages.

Pericas et al., A Two-Level Load/Store Queue Based on Execution Locality, 2008 International Symposium on Computer Architecture, DOI: 10.1109/ISCA.2008.10, date added to IEEE Xplore: Jul. 15, 2008, 13 pages.

Ros et al., The Superfluous Load Queue, 2018 51st Annual IEEE/ACM International Symposium on Microarchitecture (MICRO), DOI: 10.1109/MICRO.2018.00017, date added to IEEE Xplore: Dec. 13, 2018, 13 pages.

Sethumadhavan et al., Scalable Hardware Memory Disambiguation for High ILP Processors, Proceedings of the 36th IEEE/ACM International Symposium on Microarchitecture (MICRO-36 2003), DOI: 10.1109/MICR0.2003.1253244, date added to IEEE Xplore: Jan. 8, 2004, 12 pages.

Sha et al., Scalable Store-Load Forwarding via Store Queue Index Prediction, University of Pennsylvania, 38th Annual IEEE/ACM International Symposium on Microarchitecture (MICRO '05), DOI: 10.1109/MICRO.2005.29, date added to IEEE Xplore: Dec. 5, 2005, 30 pages.

Stone et al., Address-Indexed Memory Disambiguation and Store-to-Load Forwarding, 38th Annual IEEE/ACM International Symposium on Microarchitecture (MICRO '05), DOI: 10.1109/MICRO.2005.10, date added to IEEE Xplore: Dec. 5, 2005, 12 pages.

* cited by examiner

ADDRESS-BASED FILTERING FOR LOAD/STORE SPECULATION

CROSS-REFERENCE TO RELATED APPLICATIONS

This application is a continuation application of and claims priority from U.S. patent application Ser. No. 16/658,474, filed on Oct. 21, 2019.

STATEMENT REGARDING FEDERALLY SPONSORED RESEARCH OR DEVELOPMENT

This disclosure was made with Government support under PathForward Project with Lawrence Livermore National Security (Prime Contract No. DE-AC52-07NA27344, Subcontract No. B620717) awarded by DOE. The Government has certain rights in this disclosure.

BACKGROUND

Computer processors that employ data speculation typically allow load and store instructions within the load store unit to complete out of program order. This data speculation requires that memory dependencies be checked for ordering violations to prevent ordering violation errors. These checks may require full physical address comparisons between a load or store and a subset of in-flight stores or loads. For some memory consistency models, the checks also require comparing the full physical address of an external probe to the physical address of an in-flight load. Preventing ordering violations typically involves the use of content addressable memory (CAM) structures.

DETAILED DESCRIPTION

Using content addressable memory (CAM) structures and lookup operations to prevent ordering violation errors is expensive in terms of power use. Therefore, by reducing the number of CAM lookups in the load store unit (LSU), the overall power use of the LSU is reduced. Embodiments of the present disclosure use a filtering mechanism to bypass memory operations such as CAM lookups for some incoming instructions. This filtering mechanism operates by maintaining a table of entries corresponding to addresses or address ranges of previously received store or load instructions. If an incoming store instruction, load instruction, or cache probe includes a target address in a range for which no previously received instruction has targeted that incoming store instruction, load instruction, or cache probe does not require a CAM lookup and is forwarded toward completion. This filtering mechanism, in some embodiments, is utilized in a number of different stages in the LSU pipeline.

Figure 1:
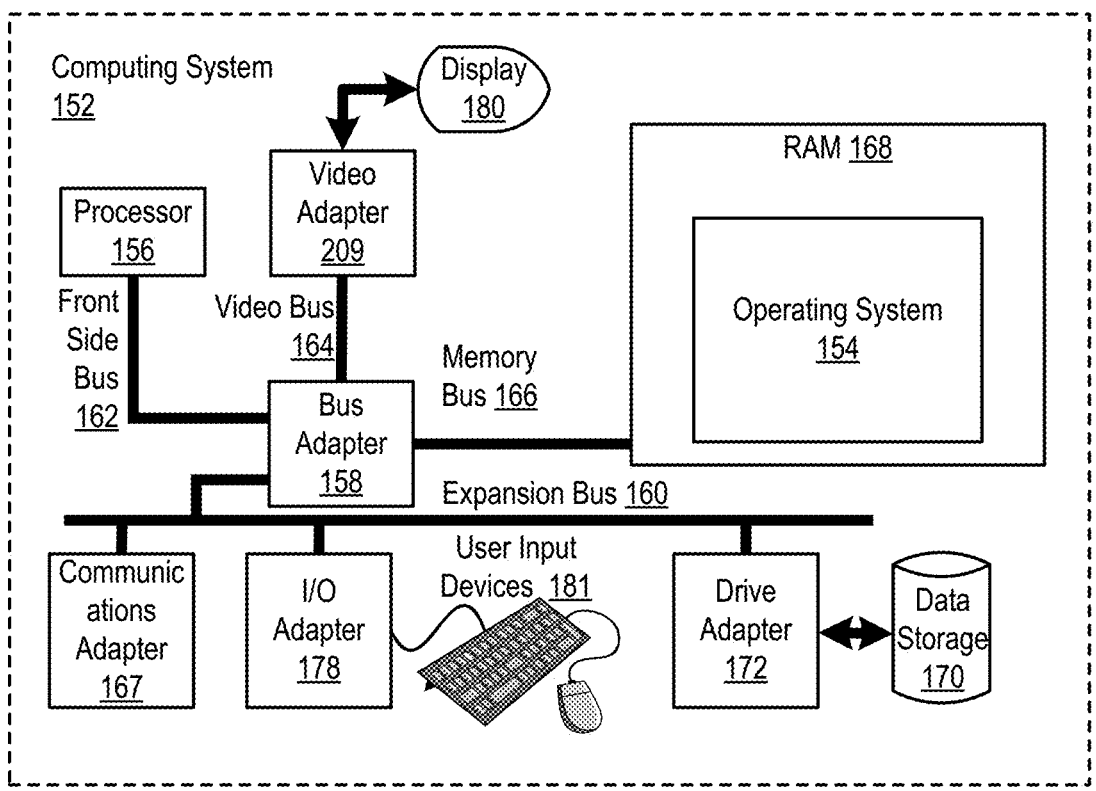
FIG. 1 sets forth a block diagram of an example system for address-based filtering for load/store speculation according to embodiments of the present disclosure.

FIG. 1 is a block diagram of a non-limiting example computing system (152) for address-based filtering for load/store speculation according to some embodiments. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers for address-based filtering for load/store speculation include UNIX™, Linux™, Microsoft Windows™, AIX™, and others as will occur to those of skill in the art. The operating system (154) in the example of FIG. 1 is shown in RAM (168), but many components of such software typically are stored in non-volatile memory also, such as, for example, on data storage (170), such as a disk drive.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters in some embodiments include Integrated Drive Electronics ('IDE') adapters, Small Computer System Interface ('SCSI') adapters, and others as will occur to those of skill in the art. Non-volatile computer memory, in some embodiments, is implemented as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications, in some embodiments, is carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters, in some embodiments, includes modems for wired dial-up communications, Ethernet (IEEE 802.3) adapters for wired data communications, and 802.11 adapters for wireless data communications.

Figure 2:
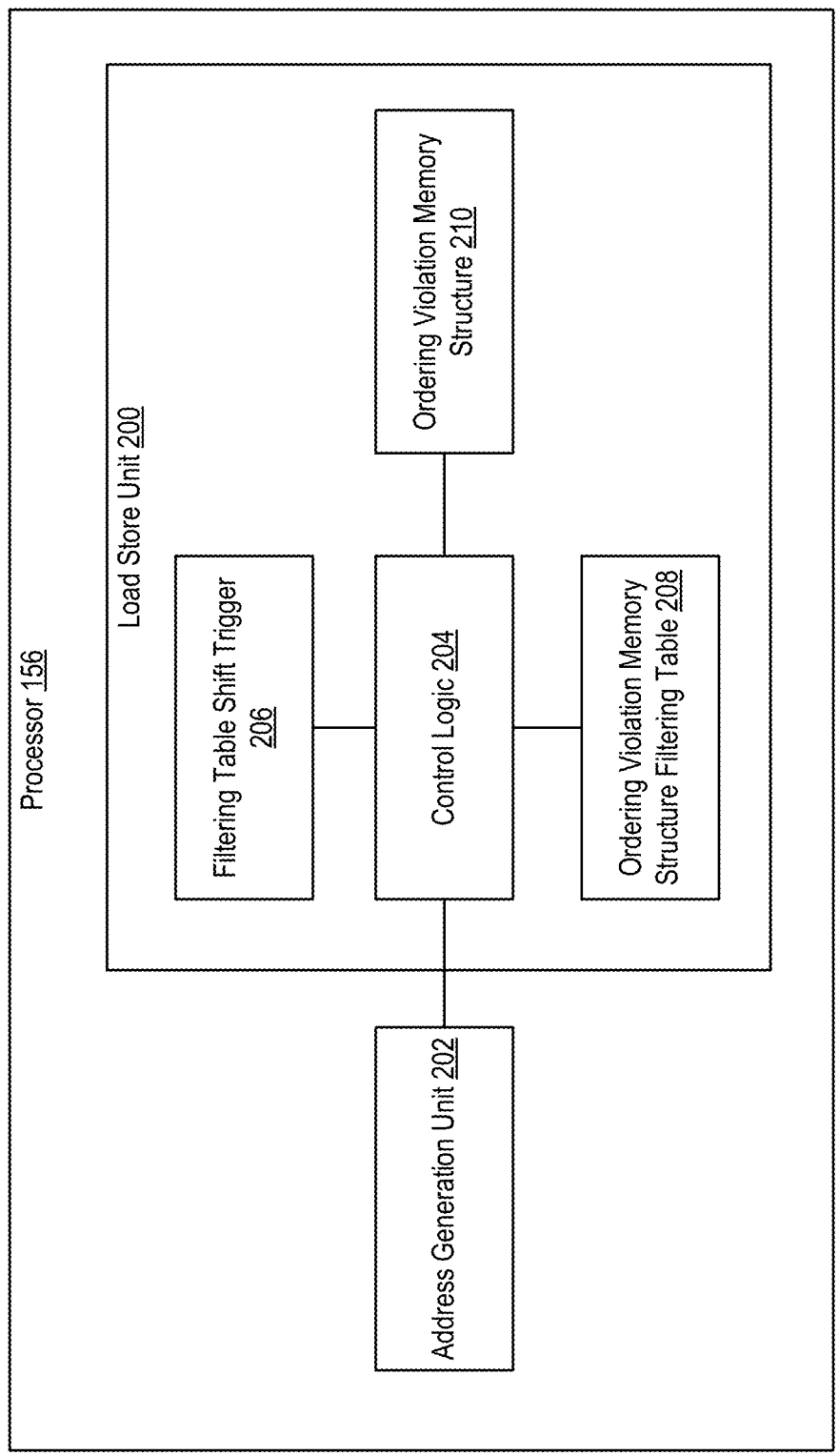
FIG. 2 sets forth a block diagram of an example system for address-based filtering for load/store speculation according to embodiments of the present disclosure.

FIG. 2 is a block diagram of a non-limiting example processor (156) for address-based filtering for load/store speculation according to some embodiments. As shown in FIG. 2, the example processor (156) includes a load store unit (LSU) (200), an address generation unit (202), control logic (204), a filtering table shift trigger (206), an ordering violation memory structure filtering table (208), and an ordering violation memory structure (210). The depiction of the LSU (200) in FIG. 2 includes elements representative of different specific structures in the LSU (200). Specifically, the filtering table shift trigger (206) and the ordering violation memory structure (210), in some embodiments, apply to a number of different elements along the LSU (200) pipeline, as described below.

The LSU (200) is a portion of the processor (156) that executes load and store instructions. The LSU (200) is responsible for checking for memory dependencies and ordering violations when loads and stores are allowed to complete out of program order. The control logic (204) of the LSU (200) carries out the functionality of the LSU (200), including carrying out load instructions and store instructions to completion. The control logic (204) in FIG. 2 is depicted as a separate element within the LSU (200) for illustrative purposes. In actuality, the control logic (204) is a collection of behaviors within and between other elements on the LSU (200). The address generation unit (202) computes the physical address for load instructions and store instructions, and provides the physical address to the LSU (200) as an initial step in carrying out the load instruction or store instruction.

The filtering table shift trigger (206) is a data structure used by the control logic (204) to trigger a shift in the filtering table (208). The control logic (204) monitors the filtering table shift trigger (206) for a specific condition upon which the control logic (204) initiates a shift in the filtering table (208). The shift in the filtering table is performed to maintain parity with the memory locations targeted by the load instructions and store instructions. The filtering table shift trigger (206), in some embodiments, is a queue allocated and deallocated in program order, such as the store queue (STQ) or load tracking queue (LTQ) of the LSU (200). The shift, in some embodiments, is triggered by the reuse of a particular pre-programed slot in the queue. The particular slot, in some embodiments, is pre-programmed using a basic input/output system (BIOS) setting.

The ordering violation memory structure (210) is a memory structure, such as a CAM structure, that operates as part of the control logic's memory dependency and ordering violation checks. Examples of ordering violation memory structures (210) include the store-to-load forwarding (STLF) CAM, the out-of-order buffer (OOB) CAM, and the load order queue (LOQ) CAM. Because lookup operations in these ordering violation memory structures are expensive in terms of power use, embodiments of the disclosure include a filtering table (208) to reduce the number of lookup operations by tracking residency of in-flight loads and stores in a pre-defined physical address range within the filtering table (208) without any full or partial address comparisons.

The STLF CAM is a memory structure used by the LSU (200) to verify that a load about to be executed has the same target address as an older store yet to be carried out. When the execution of the load is scheduled by the load store queue (LSQ), the control logic (204) compares all entries in the STLF CAM with the load's target address to determine whether there exists any prior older stores to the same target address as that of the load. The OOB CAM performs a similar function as the STLF CAM, but detects memory ordering violations between store instructions and load instructions that were missed when the load was first scheduled to memory by the LSQ. This is possible because at the time of the load's execution, not all prior older stores may have generated their physical addresses. A completed load stays in the OOB as long as it takes for all older stores to generate their physical addresses and check for dependencies. Similarly, the LOQ CAM detects memory ordering violations between load instructions (of the same or different threads) by monitoring cache events. Cache events include cache probes, such as a level 1 data cache probe, and cache evictions, such as a level 1 data cache eviction.

The ordering violation memory structure filtering table (208) is a mechanism to filter out, from the ordering violation memory structure (210), certain ordering check triggering transactions (e.g., load instructions, store instructions, and cache events) for which ordering violations including dependency violations exist. The filtering table (208) includes entries representing a target address (i.e., physical address or logical address) or range of target addresses of the ordering check triggering transactions. For example, the filtering table, in some embodiments, includes $2^N$ entries, where N is a subset of the bits in the target address of the ordering check triggering transaction. A filtering table (208), in some embodiments, is implemented for each or any ordering violation memory structure (210) in the LSU (200).

The ordering violation memory structure filtering table (208), in some embodiments, is implemented as two or more separate filtering tables. Each of the filtering tables, in some embodiments, is devoted to a different set of ranges of target addresses. An initial determination, in some embodiments, is made by the control logic (204) as to which of the filtering tables to query based on a portion of the target address.

Figure 3:
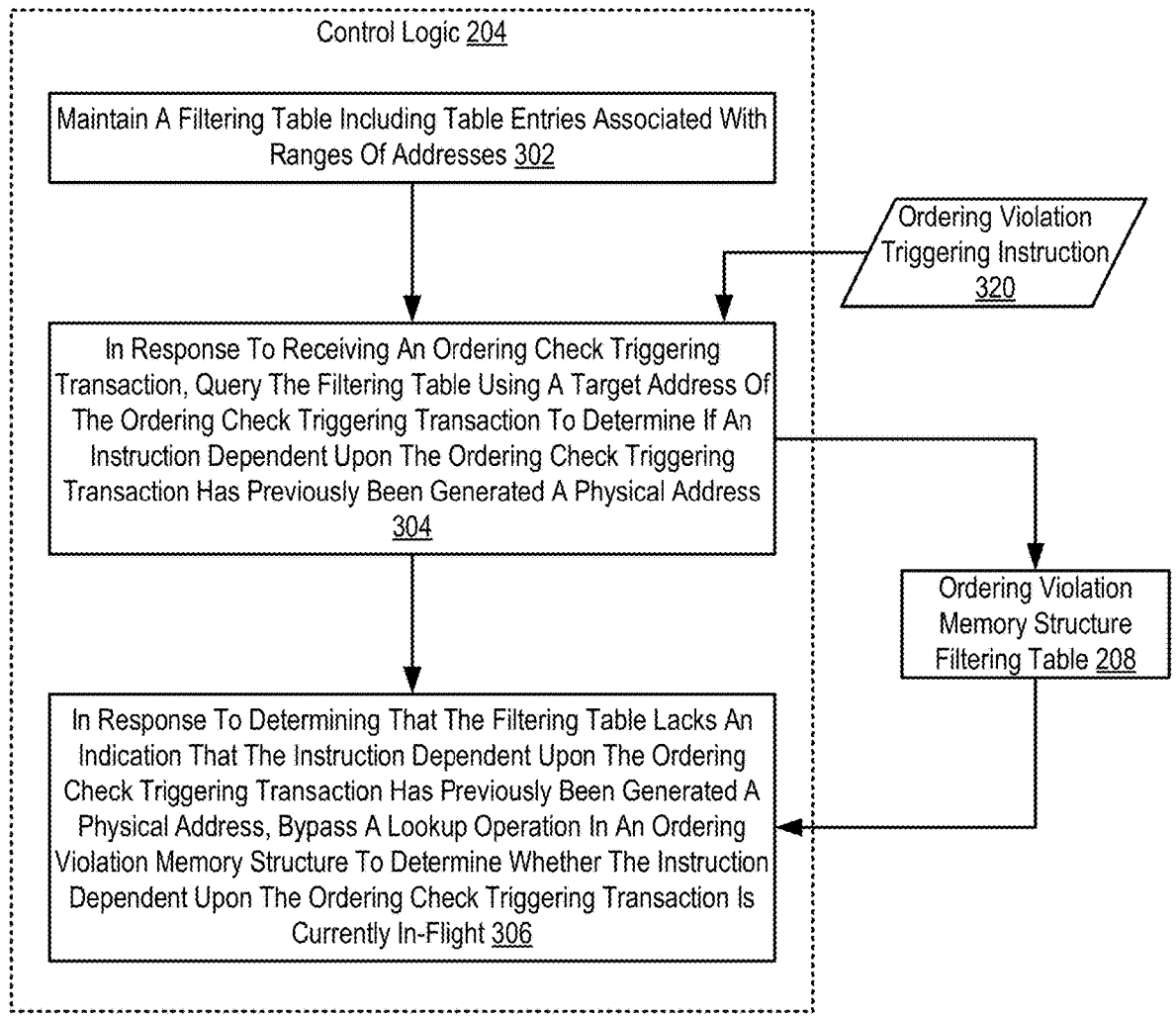
FIG. 3 sets forth a flow chart illustrating an exemplary method for address-based filtering for load/store speculation according to embodiments of the present disclosure.

FIG. 3 sets forth a flow chart illustrating a non-limiting exemplary method for address-based filtering for load/store speculation according to some embodiments that includes maintaining (302) a filtering table including table entries associated with ranges of addresses. Maintaining (302) a filtering table including table entries associated with ranges of addresses, in some embodiments, is carried out by the control logic (204) placing indications in the filtering table for potential ordering violations. Maintaining (302) a filtering table including table entries associated with ranges of addresses, in some embodiments, is carried out by the control logic (204) shifting the table entry based on a condition of a filtering table shift trigger.

The method of FIG. 3 further includes in response to receiving an ordering check triggering transaction (320), querying (304) the filtering table (208) using a target address of the ordering check triggering transaction (320) to determine if an instruction dependent upon the ordering check triggering transaction (320) has previously been generated a physical address. Receiving an ordering check triggering transaction (320), in some embodiments, is carried out by the control logic (204) detecting that the address generation unit has provided a physical address for an ordering check triggering transaction (320) (e.g., a load instruction, a store instruction, a cache event). The control logic (204), in some embodiments, receives the physical address from the address generation unit and extracts a subset of the physical address for use as a key into the filtering table (208). Alternatively, the control logic (204), in some embodiments, uses a portion of the logical address as a key into the filtering table (208).

Querying (304) the filtering table (208) using a target address of the ordering check triggering transaction (320) to determine if an instruction dependent upon the ordering check triggering transaction (320) has previously been generated a physical address, in some embodiments, is carried out by the control logic (204) generating a query entry identifier using a portion of the target address (i.e., physical address or logical address) and accessing the entry identified by the entry identifier. For example, the entry identifier, in some embodiments, is generated from the physical address using [M:M+N−1], where M is the starting address of memory window and N is the subset of physical address bits for the filtering table (208).

The method of FIG. 3 further includes in response to determining that the filtering table (208) lacks an indication that the instruction dependent upon the ordering check triggering transaction (320) has previously been generated a physical address, bypassing (306) a lookup operation in an ordering violation memory structure to determine whether the instruction dependent upon the ordering check triggering transaction (320) is currently in-flight. "In-flight" refers to an instruction that has been completed but not yet retired. Determining that the filtering table (208) lacks an indication that the instruction dependent upon the ordering check triggering transaction (320) has previously been generated a physical address, in some embodiments, is carried out by the control logic (204) accessing the entry in the filtering table and determining that the entry's contents are zero. Because there is no indication of a previous instruction dependent upon the ordering check triggering transaction (320), the control logic (204) is assured that no previous dependent instruction is currently in-flight (i.e., data has not been loaded from or stored to the target physical address by any in-flight instruction in the pipeline).

Bypassing (306) a lookup operation in an ordering violation memory structure to determine whether the instruction dependent upon the ordering check triggering transaction (320) is currently in-flight, in some embodiments, is carried out by the control logic (204) operating as though the lookup operation in the ordering violation memory structure has been performed, and a response has been returned that indicates that no instruction dependent upon the ordering check triggering transaction (320) is currently in-flight (i.e. data has not been loaded from or stored to the target physical address by any in-flight instruction in the pipeline).

The above features improve the operation of the computer system by avoiding expensive lookup operations in memory structures by maintaining a filtering table for incoming ordering check triggering transactions (e.g., load instructions, store instructions, cache events) where, in some circumstances, a lack of dependent instructions can be identified using a less expensive accessing of the filtering table. Further, by lowering the dynamic power consumption without performance degradation, the execution of applications that execute large numbers of load/store micro-operations in the processor core is made more power efficient.

Figure 4:
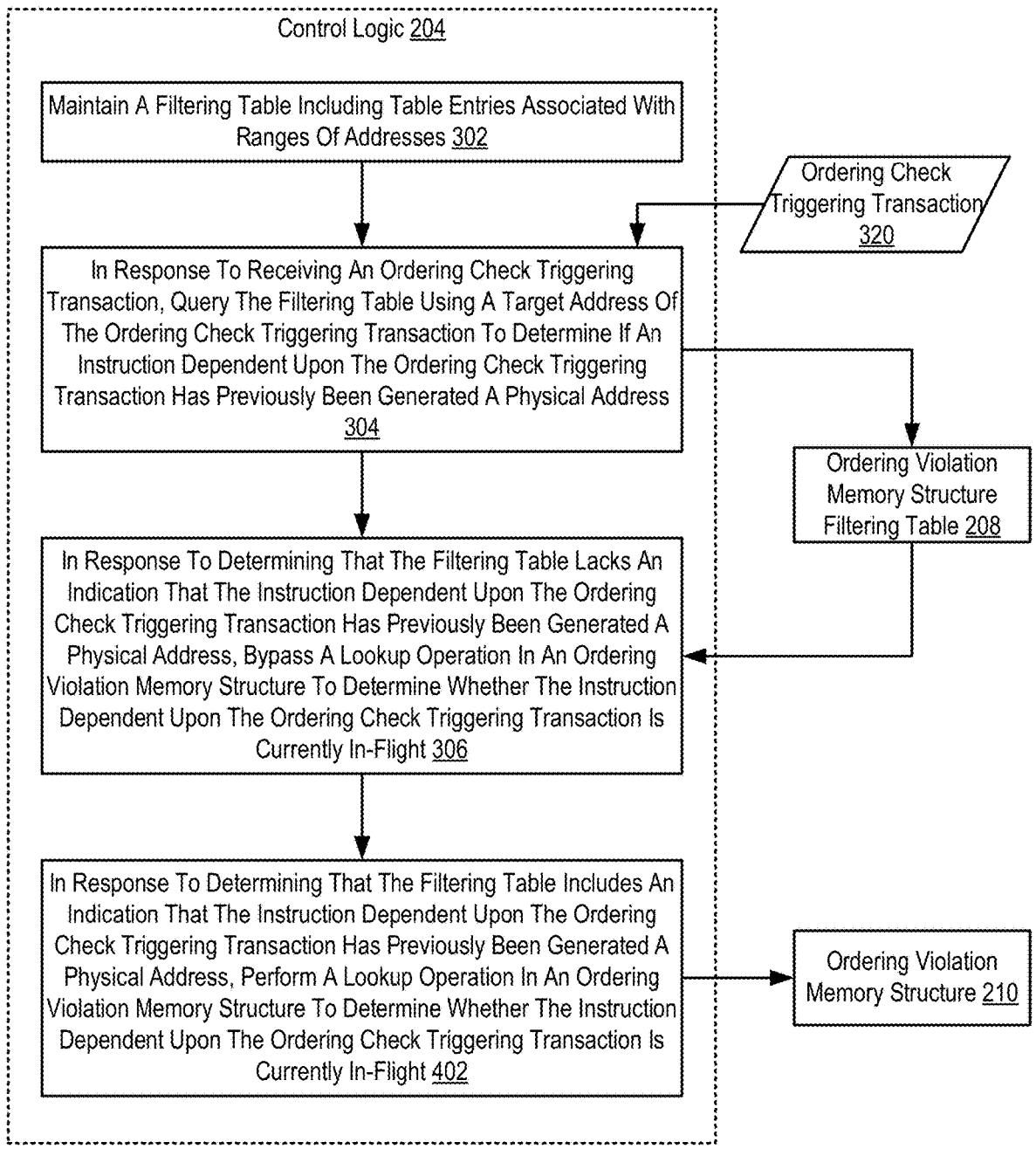
FIG. 4 sets forth a flow chart illustrating an exemplary method for address-based filtering for load/store speculation according to embodiments of the present disclosure.

For further explanation, FIG. 4 sets forth a flow chart illustrating a further exemplary method for address-based filtering for load/store speculation according to embodiments that includes maintaining (302) a filtering table including table entries associated with ranges of addresses; in response to receiving an ordering check triggering transaction (320), querying (304) the filtering table (208) using a target address of the ordering check triggering transaction (320) to determine if an instruction dependent upon the ordering check triggering transaction (320) has previously been generated a physical address; and in response to determining that the filtering table (208) lacks an indication that the instruction dependent upon the ordering check triggering transaction (320) has previously been generated a physical address, bypassing (306) a lookup operation in an ordering violation memory structure to determine whether the instruction dependent upon the ordering check triggering transaction (320) is currently in-flight.

The method of FIG. 4 differs from the method of FIG. 3, however, in that the method of FIG. 4 further includes in response to determining that the filtering table (208) includes an indication that the instruction dependent upon the ordering check triggering transaction (320) has previously been generated a physical address, performing (402) a lookup operation in an ordering violation memory structure (210) to determine whether the instruction dependent upon the ordering check triggering transaction (320) is currently in-flight.

Determining that the filtering table (208) includes an indication that the instruction dependent upon the ordering check triggering transaction (320) has previously been generated a physical address, in some embodiments, is carried out by the control logic (204) accessing the entry in the filtering table and determining that the entry is not zero (i.e., the entry has been marked to indicate that a previous dependent instruction potentially is in-flight (i.e., data has not been loaded from or stored to the target physical address by any in-flight instruction)). If each entry represents a range of addresses, the marking of an entry does not necessarily indicate the existence of an ordering violation. Instead, the mark indicates that a dependent instruction has had a physical address generated that targets the same range. Because there is an indication of a previous instruction potentially dependent upon the ordering check triggering transaction (320), the control logic (204) has no assurance that a previous dependent instruction is not currently in-flight (i.e., data has not been loaded from or stored to the target physical address by any in-flight instruction). In such a case, the comparatively more expensive lookup operations in the ordering violation memory structure (210) is performed to determine whether the instruction dependent upon the ordering check triggering transaction (320) is currently in-flight.

Figure 5:
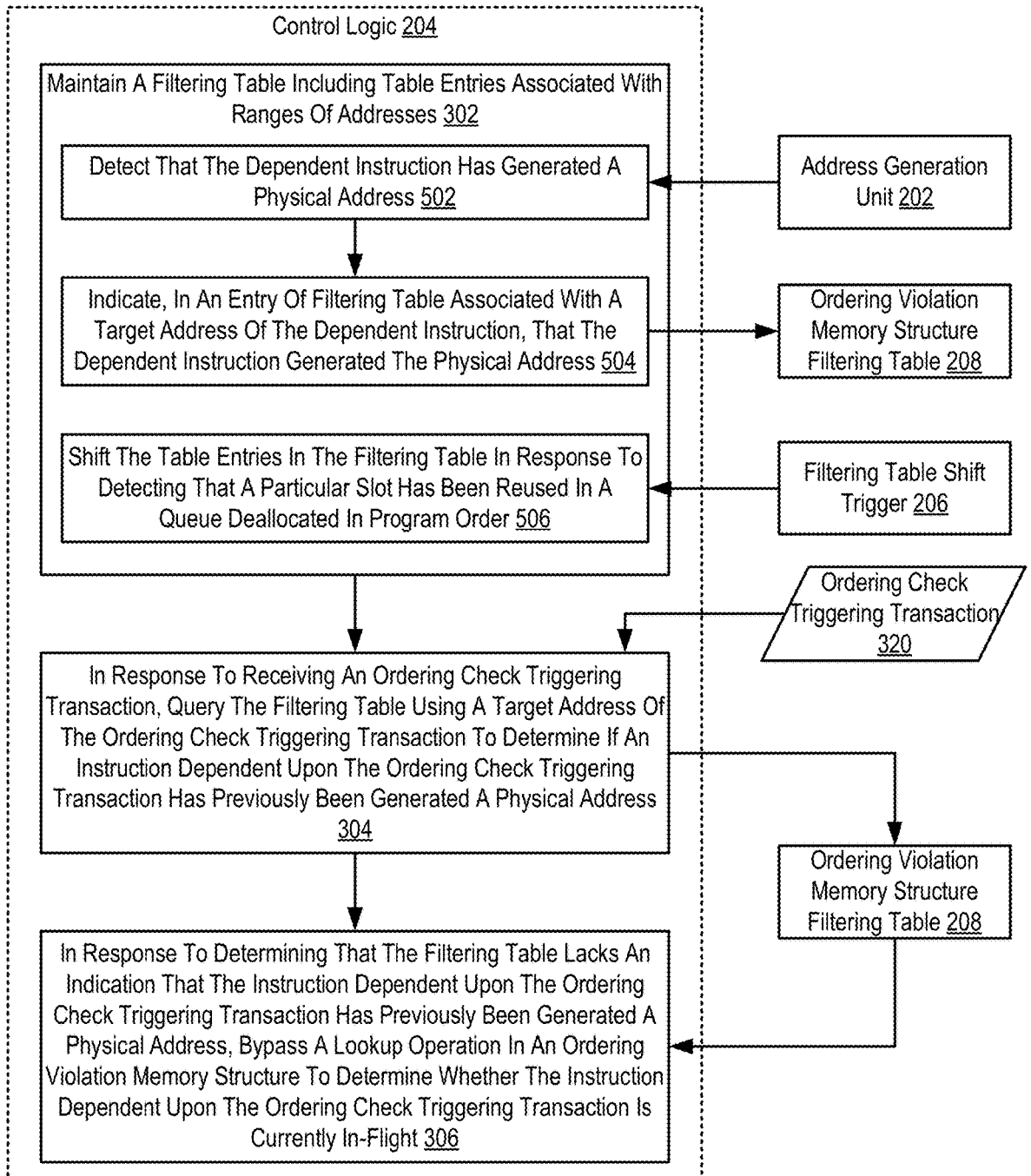
FIG. 5 sets forth a flow chart illustrating an exemplary method for address-based filtering for load/store speculation according to embodiments of the present disclosure.

For further explanation, FIG. 5 sets forth a flow chart illustrating a further exemplary method for address-based filtering for load/store speculation according to embodiments that includes maintaining (302) a filtering table including table entries associated with ranges of addresses; in response to receiving an ordering check triggering transaction (320), querying (304) the filtering table (208) using a target address of the ordering check triggering transaction (320) to determine if an instruction dependent upon the ordering check triggering transaction (320) has previously been generated a physical address; and in response to determining that the filtering table (208) lacks an indication that the instruction dependent upon the ordering check triggering transaction (320) has previously been generated a physical address, bypassing (306) a lookup operation in an ordering violation memory structure to determine whether the instruction dependent upon the ordering check triggering transaction (320) is currently in-flight.

The method of FIG. 5 differs from the method of FIG. 3, however, in that maintaining (302) a filtering table including table entries associated with ranges of addresses includes detecting (502) that a dependent instruction has generated a physical address; indicating (504), in an entry of filtering table (208) associated with a target address of the dependent instruction, that the dependent instruction generated the physical address; and shifting (506) the table entries in the filtering table (208) in response to detecting that a particular slot has been reused in a queue deallocated in program order.

Detecting (502) that a dependent instruction has generated a physical address, in some embodiments, is carried out by the control logic (204) being notified by the address generation unit (202) that a physical address for a particular type of dependent instruction (e.g., a load instruction or a store instruction) has been generated. The control logic (204), in some embodiments, receives the physical address for the instruction, the logical address for the instruction, or a portion of either.

Indicating (504), in an entry of filtering table (208) associated with a target address of the dependent instruction, that the dependent instruction generated the physical address, in some embodiments, is carried out by the control logic (204) marking an entry for the target address in the filtering table (208). The control logic (204), in some embodiments, marks the entry in a manner that uses a minimal amount of power. For example, the control logic (204), in some embodiments, writes a value of "0x03" to indicate a non-zero entry.

Detecting that a particular slot has been reused in a queue deallocated in program order, in some embodiments, is carried out by the control logic (204) monitoring the filtering table shift trigger (206) for the condition upon which the filtering table (208) is to be shifted. The condition in some embodiments, is the reuse of a specified slot in the queue. Shifting (506) the table entries in the filtering table (208) in response to detecting that a particular slot has been reused in a queue deallocated in program order, in some embodiments, is carried out by the control logic (204) advancing each table entry by one unit to ensure that when an entry is zero then there is no load/store in-flight with the same physical address bits as the address indexing. The queue deallocated in program order in some embodiments, is the store queue or the load tracking queue, depending upon the ordering violation memory structure for which the filtering is performed. Alternatively, the filtering table shift trigger (206), in some embodiments, is the detection of a reuse of a pre-selected reorder buffer ID in the instruction window.

Figure 6:
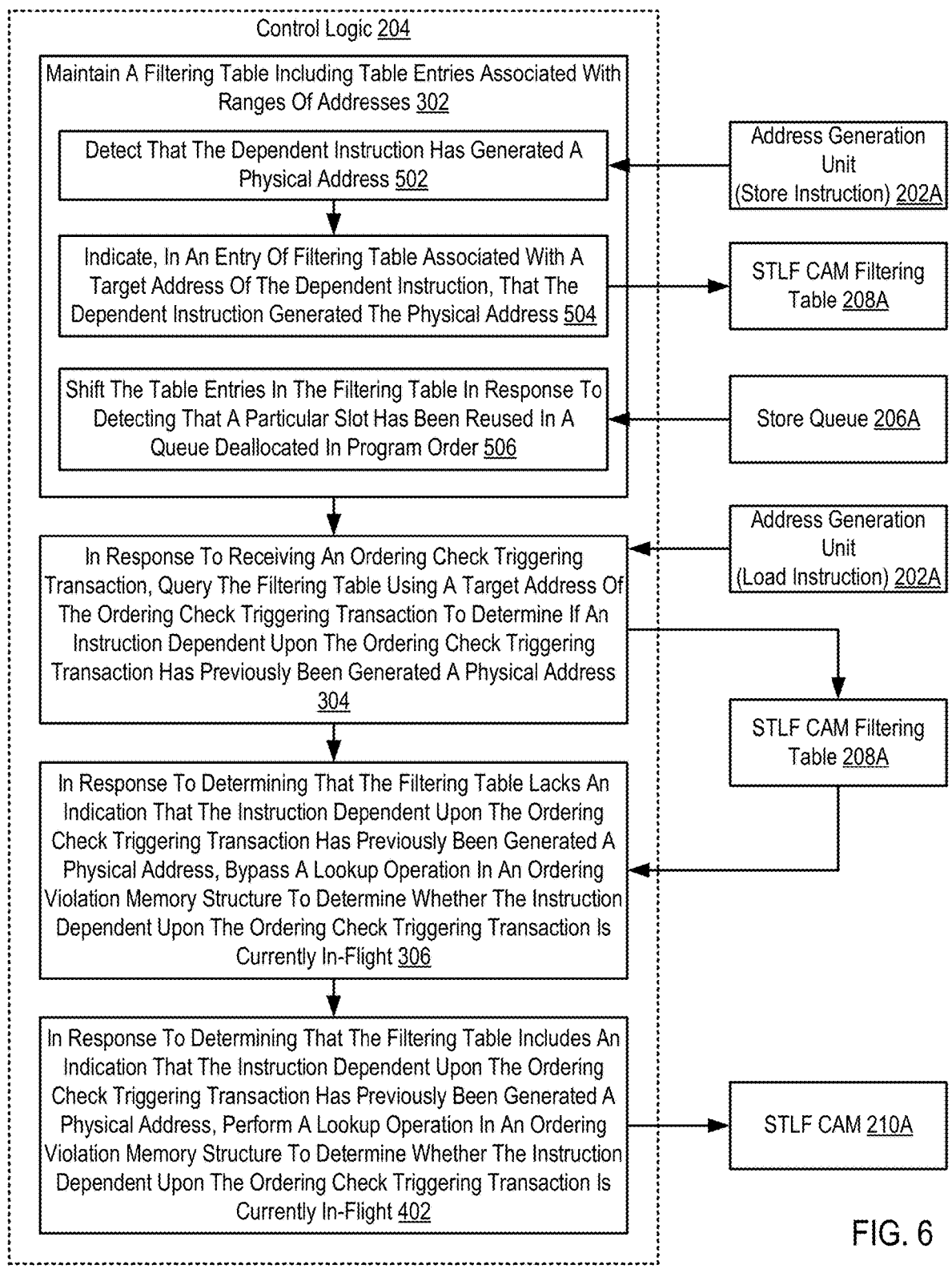
FIG. 6 sets forth a flow chart illustrating an exemplary method for address-based filtering for load/store speculation according to embodiments of the present disclosure.
Figure 7:
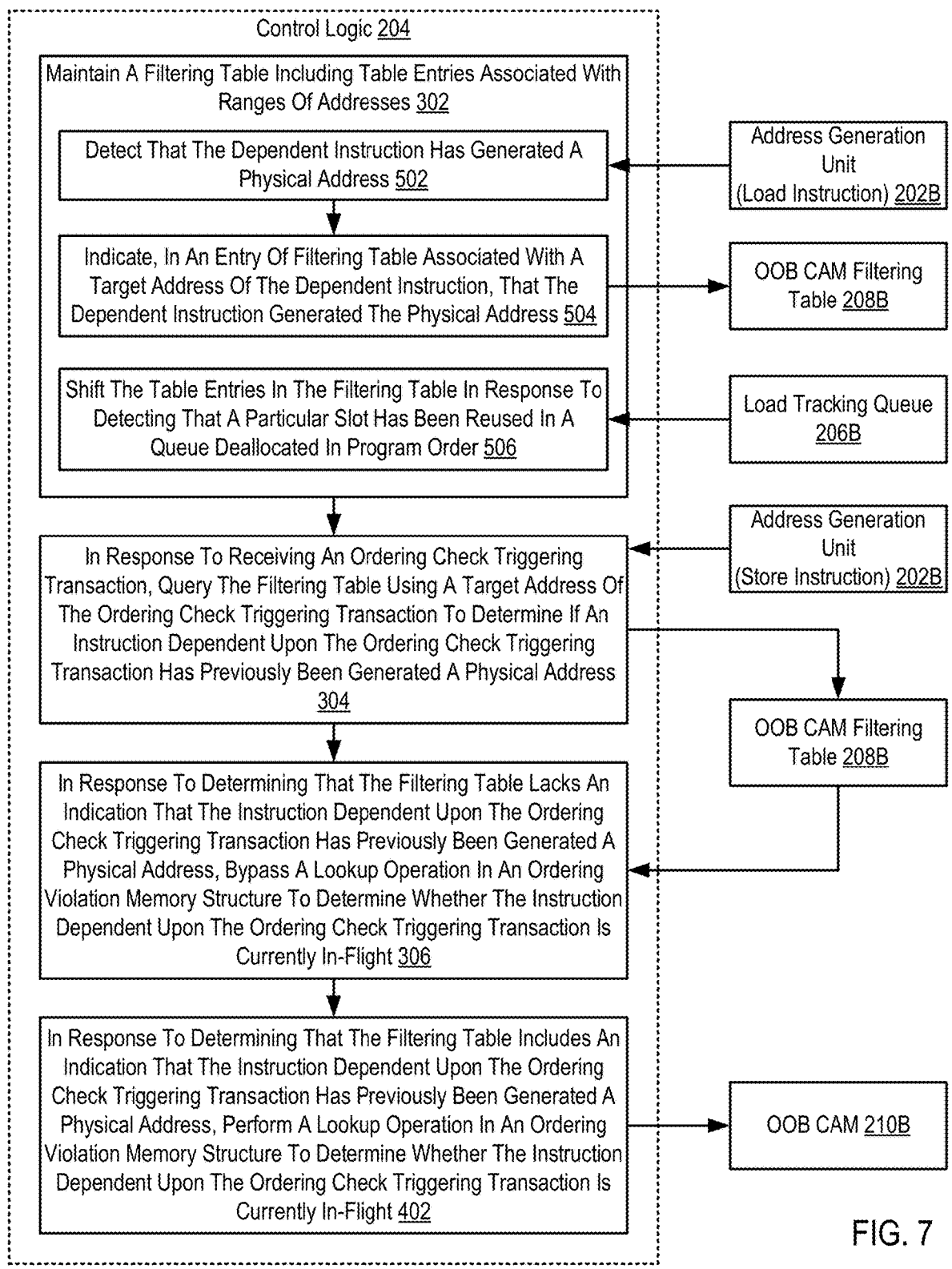
FIG. 7 sets forth a flow chart illustrating an exemplary method for address-based filtering for load/store speculation according to embodiments of the present disclosure.
Figure 8:
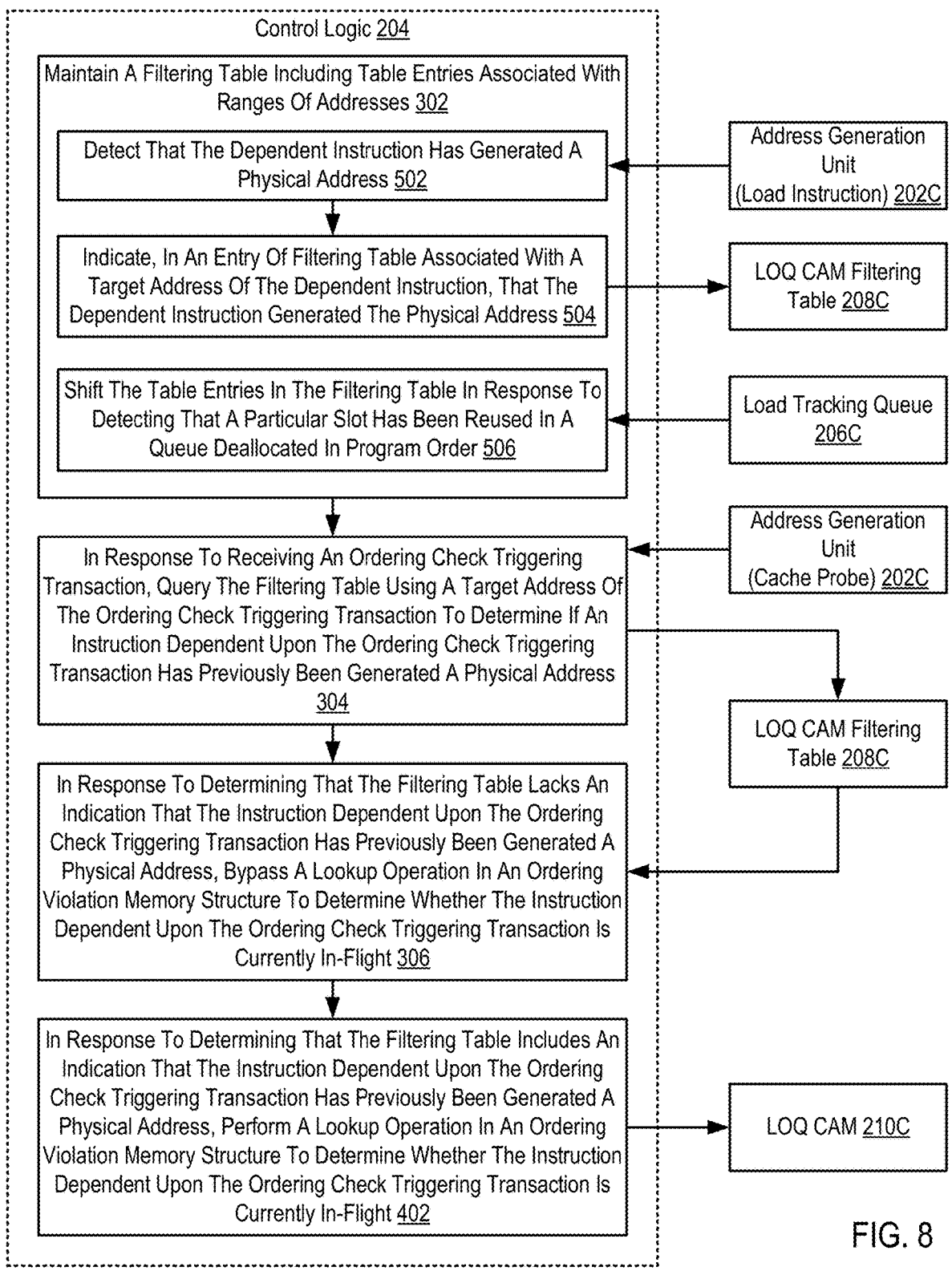
FIG. 8 sets forth a flow chart illustrating an exemplary method for address-based filtering for load/store speculation according to embodiments of the present disclosure.

For further explanation, FIGS. 6, 7, and 8 set forth flow charts illustrating contextual examples of the methods described in FIGS. 3, 4, and 5. Specifically, FIGS. 6, 7, and 8 set forth flow charts illustrating examples in the context of a store-to-load forwarding (STLF) CAM, an out-of-order buffer (OOB) CAM, and a load order queue (LOQ) CAM, respectively. FIG. 6 sets forth a flow chart illustrating an exemplary method for address-based filtering for load/store speculation according to embodiments within the context of a STLF CAM. As in the combination of FIGS. 3, 4, and 5, FIG. 6 includes maintaining (302) a filtering table including table entries associated with ranges of addresses, including detecting (502) that a dependent (store) instruction has generated a physical address, indicating (504), in an entry of filtering table (208A) associated with a target address of the dependent (store) instruction, that the dependent (store) instruction generated the physical address, and shifting (506) the table entries in the filtering table (208A) in response to detecting that a particular slot has been reused in a queue deallocated in program order. FIG. 6 further includes in response to receiving an ordering check triggering transaction (load instruction) (320), querying (304) the filtering table (208A) using a target address of the ordering check triggering transaction (load instruction) (320) to determine if a (store) instruction dependent upon the ordering check triggering transaction (load instruction) (320) has previously been generated a physical address; in response to determining that the filtering table (208A) lacks an indication that the (store) instruction dependent upon the ordering check triggering transaction (load instruction) (320) has previously been generated a physical address, bypassing (306) a lookup operation in an ordering violation memory structure to determine whether the (store) instruction dependent upon the ordering check triggering transaction (load instruction) (320) is currently in-flight; and in response to determining that the filtering table (208A) includes an indication that the (store) instruction dependent upon the ordering check triggering transaction (load instruction) (320) has previously been generated a physical address, performing (402) a lookup operation in an ordering violation memory structure (210A) to determine whether the (store) instruction dependent upon the ordering check triggering transaction (load instruction) (320) is currently in-flight.

In the example method of FIG. 6, detecting (502) that a dependent instruction has generated a physical address is carried out by the control logic (204) detecting that a store instruction has been generated a physical address by the address generation unit (202A). Each time the control logic (204) is notified that the address generation unit (202A) has generated a physical address for a store instruction, the filtering table (208A) for the STLF CAM (210A) is updated. Specifically, in the example method of FIG. 6, indicating (504), in an entry of filtering table (208A) associated with a target address of the dependent instruction, that the dependent instruction generated the physical address is carried out by the control logic (204) using a subset of the bits of the target address (i.e., a portion of the physical address or logical address) of the store instruction as an identification of an entry in the filtering table (208A) for the STLF CAM (210A). That entry, representing a range of target addresses, is marked with 0x03. This action indicates that an in-flight store instruction exists that targets an address within the indicated entry range.

In the example method of FIG. 6, shifting (506) the table entries in the filtering table (208A) in response to detecting that a particular slot has been reused in a queue deallocated in program order is carried out by the control logic (204) detecting that a pre-programmed slot in the store queue (206A) has been reused. In the event of a pipeline partial or full flush the table is not modified. Because the store queue is allocated and deallocated in program order, the store queue operates in a similar manner to a first-in-first-out queue, and a flush of the table is therefore not necessary.

In the example method of FIG. 6, receiving an ordering check triggering transaction (320) is carried out by the control logic (204) detecting that a load instruction has been generated a physical address by the address generation unit (202A). Each time the control logic (204) is notified that the address generation unit (202A) has generated a physical address for a load instruction, the filtering table (208A) for the STLF CAM (210A) is queried. In the example method of FIG. 6, querying (304) the filtering table (208A) using a target address of the ordering check triggering transaction (320) to determine if an instruction dependent upon the ordering check triggering transaction (320) has previously been generated a physical address is carried out by the control logic (204) querying the filtering table (208A) using the target address of the load instruction to determine if an in-flight store instruction has previously been generated a physical address in the same range of the target address of the load instruction.

In the example method of FIG. 6, determining that the filtering table (208A) lacks an indication that the instruction dependent upon the ordering check triggering transaction (320) has previously been generated a physical address is carried out by the control logic (204) accessing the STLF CAM filtering table (208A) using a portion of the target address of the load instruction and reading out a zero entry (e.g., "0x0"). Consequently, the control logic (204) determines that the associated entry in the filtering table (208A) lacks an indication that an in-flight store instruction for the same target address range has previously been generated a physical address by the address generation unit (202A).

In the example method of FIG. 6, bypassing (306) a lookup operation in an ordering violation memory structure to determine whether the instruction dependent upon the ordering check triggering transaction (320) is currently in-flight is carried out by the control logic (204) bypassing the lookup operation in the STLF CAM (210A) to determine whether the store instruction is currently in-flight (i.e., whether data was stored in the target physical address by an in-flight store instruction).

In the example method of FIG. 6, determining that the filtering table (208A) includes an indication that the instruction dependent upon the ordering check triggering transaction (320) has previously been generated a physical address is carried out by the control logic (204) accessing the STLF CAM filtering table (208A) using a portion of the target address of the load instruction and reading out a non-zero entry. Consequently, the control logic (204) determines that the associated entry in the filtering table (208A) includes an indication that an in-flight store instruction for the same target address range has previously been generated a physical address by the address generation unit (202A).

In the example method of FIG. 6, performing (402) a lookup operation in an ordering violation memory structure (210A) to determine whether the instruction dependent upon the ordering check triggering transaction (320) is currently in-flight is carried out by the control logic (204) performing a CAM lookup operation on the STLF CAM (210A) to determine whether the load instruction is subject to a dependency with an in-flight store instruction.

FIG. 7 sets forth a flow chart illustrating an exemplary method for address-based filtering for load/store speculation according to embodiments within the context of an OOB CAM. As in the combination of FIGS. 3, 4, and 5, FIG. 7 includes maintaining (302) a filtering table including table entries associated with ranges of addresses, including detecting (502) that a dependent (load) instruction has generated a physical address, indicating (504), in an entry of filtering table (208B) associated with a target address of the dependent (load) instruction, that the dependent (load) instruction generated the physical address, and shifting (506) the table entries in the filtering table (208B) in response to detecting that a particular slot has been reused in a queue deallocated in program order. FIG. 7 further includes in response to receiving an ordering check triggering transaction (store instruction) (320), querying (304) the filtering table (208B) using a target address of the ordering check triggering transaction (store instruction) (320) to determine if a (load) instruction dependent upon the ordering check triggering transaction (store instruction) (320) has previously been generated a physical address; in response to determining that the filtering table (208B) lacks an indication that the (load) instruction dependent upon the ordering check triggering transaction (store instruction) (320) has previously been generated a physical address, bypassing (306) a lookup operation in an ordering violation memory structure to determine whether the (load) instruction dependent upon the ordering check triggering transaction (store instruction) (320) is currently in-flight; and in response to determining that the filtering table (208B) includes an indication that the (load) instruction dependent upon the ordering check triggering transaction (store instruction) (320) has previously been generated a physical address, performing (402) a lookup operation in an ordering violation memory structure (210B) to determine whether the (load) instruction dependent upon the ordering check triggering transaction (store instruction) (320) is currently in-flight.

In the example method of FIG. 7, detecting (502) that a dependent instruction has generated a physical address is carried out by the control logic (204) detecting that a load instruction has been generated a physical address by the address generation unit (202B). Each time the control logic (204) is notified that the address generation unit (202B) has generated a physical address for a load instruction, the filtering table (208B) for the OOB CAM (210B) is updated. Specifically, in the example method of FIG. 7, indicating (504), in an entry of filtering table (208B) associated with a target address of the dependent instruction, that the dependent instruction generated the physical address is carried out by the control logic (204) using a subset of the bits of the target address (i.e., a portion of the physical address or logical address) of the load instruction as an identification of an entry in the filtering table (208B) for the OOB CAM (210B). That entry, representing a range of target addresses, is marked with 0x03. This action indicates that an in-flight load instruction exists that targets an address within the indicated entry range.

In the example method of FIG. 7, shifting (506) the table entries in the filtering table (208B) in response to detecting that a particular slot has been reused in a queue deallocated in program order is carried out by the control logic (204) detecting that a pre-programmed slot in the load tracking queue (206B) has been reused. The load tracking queue (206B) is a bit vector indexed by load ID and is allocated at dispatch (in program order) and deallocated at retire (again in program order). The load tracking queue (206B) sets a bit when the corresponding load ID has been reserved by an in-flight load. The load tracking queue (206B) is managed as a first-in-first-out queue and upon a pipeline flush, the load tracking queue (206B) is cleared with the load ID of the offending load or with the load ID of the oldest load closest to the offending instruction or micro-op that triggered the pipeline flush.

In the example method of FIG. 7, receiving an ordering check triggering transaction (320) is carried out by the control logic (204) detecting that a store instruction has been generated a physical address by the address generation unit (202B). Each time the control logic (204) is notified that the address generation unit (202B) has generated a physical address for a store instruction, the filtering table (208B) for the OOB CAM (210B) is queried. In the example method of FIG. 7, querying (304) the filtering table (208B) using a target address of the ordering check triggering transaction (320) to determine if an instruction dependent upon the ordering check triggering transaction (320) has previously been generated a physical address is carried out by the control logic (204) querying the filtering table (208B) using the target address of the store instruction to determine if a load instruction has previously been generated a physical address in the same range of the target address of the store instruction.

In the example method of FIG. 7, determining that the filtering table (208B) lacks an indication that the instruction dependent upon the ordering check triggering transaction (320) has previously been generated a physical address is carried out by the control logic (204) accessing the OOB CAM filtering table (208B) using a portion of the target address of the store instruction and reading out a zero entry. Consequently, the control logic (204) determines that the associated entry in the filtering table (208B) lacks an indication that a load instruction for the same target address range has previously been generated a physical address by the address generation unit (202B).

In the example method of FIG. 7, bypassing (306) a lookup operation in an ordering violation memory structure to determine whether the instruction dependent upon the ordering check triggering transaction (320) is currently in-flight is carried out by the control logic (204) bypassing the lookup operation in the OOB CAM (210B) to determine whether the load instruction is currently in-flight (i.e., whether data was loaded from the targeted physical address by an in-flight load).

In the example method of FIG. 7, determining that the filtering table (208B) includes an indication that the instruction dependent upon the ordering check triggering transaction (320) has previously been generated a physical address is carried out by the control logic (204) accessing the OOB CAM filtering table (208B) using a portion of the target address of the store instruction and reading out a non-zero entry. Consequently, the control logic (204) determines that the associated entry in the filtering table (208B) includes an indication that a load instruction for the same target address range has previously been generated a physical address by the address generation unit (202B).

In the example method of FIG. 7, performing (402) a lookup operation in an ordering violation memory structure (210B) to determine whether the instruction dependent upon the ordering check triggering transaction (320) is currently in-flight is carried out by the control logic (204) performing a CAM lookup operation on the OOB CAM (210B) to determine whether the store instruction is subject to an ordering violation.

FIG. 8 sets forth a flow chart illustrating an exemplary method for address-based filtering for load/store speculation according to embodiments within the context of a LOQ CAM. As in the combination of FIGS. 3, 4, and 5, FIG. 8 includes maintaining (302) a filtering table including table entries associated with ranges of addresses, including detecting (502) that a dependent (first load) instruction has generated a physical address, indicating (504), in an entry of filtering table (208C) associated with a target address of the dependent (first load) instruction, that the dependent (first load) instruction generated the physical address, and shifting (506) the table entries in the filtering table (208C) in response to detecting that a particular slot has been reused in a queue deallocated in program order. FIG. 8 further includes in response to receiving an ordering check triggering transaction (second load instruction) (320), querying (304) the filtering table (208C) using a target address of the ordering check triggering transaction (second load instruction) (320) to determine if an (first load) instruction dependent upon the ordering check triggering transaction (second load instruction) (320) has previously been generated a physical address; in response to determining that the filtering table (208C) lacks an indication that the (first load) instruction dependent upon the ordering check triggering transaction (second load instruction) (320) has previously been generated a physical address, bypassing (306) a lookup operation in an ordering violation memory structure to determine whether the (first load) instruction dependent upon the ordering check triggering transaction (second load instruction) (320) is currently in-flight; and in response to determining that the filtering table (208C) includes an indication that the (first load) instruction dependent upon the ordering check triggering transaction (second load instruction) (320) has previously been generated a physical address, performing (402) a lookup operation in an ordering violation memory structure (210C) to determine whether the (first load) instruction dependent upon the ordering check triggering transaction (second load instruction) (320) is currently in-flight.

In the example method of FIG. 8, detecting (502) that a dependent instruction has generated a physical address is carried out by the control logic (204) detecting that a load instruction has been generated a physical address by the address generation unit (202C). Each time the control logic (204) is notified that the address generation unit (202C) has generated a physical address for a load instruction, the filtering table (208C) for the LOQ CAM (210C) is updated. Specifically, in the example method of FIG. 8, indicating (504), in an entry of filtering table (208C) associated with a target address of the dependent instruction, that the dependent instruction generated the physical address is carried out by the control logic (204) using a subset of the bits of the target address (i.e., a portion of the physical address or logical address) of the load instruction as an identification of an entry in the filtering table (208C) for the LOQ CAM (210C). That entry, representing a range of target addresses, is marked with 0x03. This action indicates that an in-flight load instruction exists that targets an address within the indicated entry range.

In the example method of FIG. 8, shifting (506) the table entries in the filtering table (208C) in response to detecting that a particular slot has been reused in a queue deallocated in program order is carried out by the control logic (204) detecting that a pre-programmed slot in the load tracking queue (206C) has been reused. The load tracking queue (206C), in some embodiments, is used as a filtering table shift trigger in both the OOB CAM context and the LOQ CAM contexts.

In the example method of FIG. 8, receiving an ordering check triggering transaction (320) is carried out by the control logic (204) detecting that a cache probe or cache eviction has occurred. Each time the control logic (204) is notified that a cache probe or cache eviction has occurred, the filtering table (208C) for the LOQ CAM (210B) is queried. In the example method of FIG. 8, querying (304) the filtering table (208C) using a target address of the ordering check triggering transaction (320) to determine if an instruction dependent upon the ordering check triggering transaction (320) has previously been generated a physical address is carried out by the control logic (204) querying the filtering table (208C) using the target address of the cache probe or cache eviction victim to determine if a load instruction has previously been generated a physical address in the same range of the target address of the cache probe or cache eviction victim.

In the example method of FIG. 8, determining that the filtering table (208C) lacks an indication that the instruction dependent upon the ordering check triggering transaction (320) has previously been generated a physical address is carried out by the control logic (204) accessing the LOQ CAM filtering table (208C) using a portion of the target address of the cache probe and reading out a zero entry. Consequently, the control logic (204) determines that the associated entry in the filtering table (208B) lacks an indication that a load instruction for the same target address range has previously been generated a physical address by the address generation unit (202C).

In the example method of FIG. 8, bypassing (306) a lookup operation in an ordering violation memory structure to determine whether the instruction dependent upon the ordering check triggering transaction (320) is currently in-flight is carried out by the control logic (204) bypassing the lookup operation in the LOQ CAM (210C) to determine whether the load instruction is currently in-flight (i.e., whether data was loaded from the targeted physical address by an in-flight load).

In the example method of FIG. 8, determining that the filtering table (208C) includes an indication that the instruction dependent upon the ordering check triggering transaction (320) has previously been generated a physical address is carried out by the control logic (204) accessing the LOQ CAM filtering table (208C) using a portion of the target address of the cache probe and reading out a non-zero entry. Consequently, the control logic (204) determines that the associated entry in the filtering table (208C) includes an indication that a load instruction for the same target address range has previously been generated a physical address by the address generation unit (202C).

In the example method of FIG. 8, performing (402) a lookup operation in an ordering violation memory structure (210C) to determine whether the instruction dependent upon the ordering check triggering transaction (320) is currently in-flight is carried out by the control logic (204) performing a CAM lookup operation on the LOQ CAM (210C) to determine whether the cache probe or cache eviction victim is subject to a memory ordering violation.

In view of the explanations set forth above, readers will recognize that the benefits of address-based filtering for load/store speculation according to embodiments include:
- Improving the operation of a computing system by maintaining a filtering table for incoming ordering check triggering transactions (e.g., load instructions, store instructions, cache probes, cache eviction) where, in some circumstances, a lack of dependent instructions can be identified using a less expensive accessing of the filtering table, increasing computing system power efficiency.
- Improving the operation of a computing system by lowering the dynamic power consumption without performance degradation, increasing the power efficiency of load/store micro-operations in the processor core.

Exemplary embodiments are described largely in the context of a fully functional computer system for address-based filtering for load/store speculation. Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above describes a method of address-based filtering for load/store speculation, including maintaining a filtering table including table entries associated with ranges of addresses; in response to receiving an ordering check triggering transaction, querying the filtering table using a target address of the ordering check triggering transaction to determine if an instruction dependent upon the ordering check triggering transaction has previously been generated a physical address; and in response to determining that the filtering table lacks an indication that the instruction dependent upon the ordering check triggering transaction has previously been generated a physical address, bypassing a lookup operation in an ordering violation memory structure to determine whether the instruction dependent upon the ordering check triggering transaction is currently in-flight.

The method may include, in response to determining that the filtering table includes an indication that the instruction dependent upon the ordering check triggering transaction has previously been generated a physical address, performing a lookup operation in an ordering violation memory structure to determine whether the instruction dependent upon the ordering check triggering transaction is currently in-flight.

The above also describes a load store unit of a processor, a processor, and an apparatus with address-based filtering for load/store speculation. The load store unit includes a filtering table including table entries associated with ranges of addresses, and the control logic for the load store unit maintains the filtering table; in response to receiving an ordering check triggering transaction, query the filtering table using a target address of the ordering check triggering transaction to determine if an instruction dependent upon the ordering check triggering transaction has previously been generated a physical address; and in response to determining that the filtering table lacks an indication that the instruction dependent upon the ordering check triggering transaction has previously been generated a physical address, bypass a lookup operation in an ordering violation memory structure to determine whether the instruction dependent upon the ordering check triggering transaction is currently in-flight.

The control logic, in response to determining that the filtering table includes an indication that the instruction dependent upon the ordering check triggering transaction has previously been generated a physical address, performs a lookup operation in an ordering violation memory structure to determine whether the instruction dependent upon the ordering check triggering transaction is currently in-flight.

Maintaining the filtering table including table entries for ranges of addresses may include detecting that a dependent instruction has generated a physical address; and indicating, in an entry of filtering table associated with a target address of the dependent instruction, that the dependent instruction generated the physical address. Maintaining the filtering table including table entries associated with ranges of addresses may also include shifting the table entries in the filtering table in response to detecting that a particular slot has been reused in a queue deallocated in program order. The queue deallocated in program order may be a store queue or a load tracking queue. Maintaining the filtering table including table entries associated with ranges of addresses may also include shifting the table entries in the filtering table in response to detecting a reuse of a pre-selected reorder buffer ID. The filtering table may include a plurality of separate tables.

The ordering check triggering transaction may be a load instruction. Accordingly, receiving the ordering check triggering transaction may include detecting that the load instruction has been generated a physical address, querying the filtering table using a target address of the ordering check triggering transaction to determine if an instruction dependent upon the ordering check triggering transaction has previously been generated a physical address may include querying the filtering table using the target address of the load instruction to determine if a store instruction has previously been generated a physical address, determining that the filtering table lacks an indication that the instruction dependent upon the ordering check triggering transaction has previously been generated a physical address may include determining that the filtering table lacks an indication that the store instruction has previously been generated a physical address, and bypassing a lookup operation in an ordering violation memory structure to determine whether the instruction dependent upon the ordering check triggering transaction is currently in-flight may include bypassing the lookup operation in a store-to-load forwarding memory structure to determine whether the store is currently in-flight.

The ordering check triggering transaction may be a store instruction. Accordingly, receiving the ordering check triggering transaction may include detecting that the store instruction has been generated a physical address, querying the filtering table using a target address of the ordering check triggering transaction to determine if an instruction dependent upon the ordering check triggering transaction has previously been generated a physical address may include querying the filtering table using the target address of the store instruction to determine if a load instruction has previously been generated a physical address, determining that the filtering table lacks an indication that the instruction dependent upon the ordering check triggering transaction has previously been generated a physical address may include determining that the filtering table lacks an indication that the load instruction has previously been generated a physical address, and bypassing a lookup operation in an ordering violation memory structure to determine whether the instruction dependent upon the ordering check triggering transaction is currently in-flight may include bypassing the lookup operation in an out-of-order buffer memory structure to determine whether the load is currently in-flight.

Readers will appreciate that the steps described herein may be carried out in a variety of ways and that no particular ordering is required. It will be further understood from the foregoing description that modifications and changes may be made in various embodiments of the present disclosure. The descriptions in this specification are for purposes of illustration only and are not to be construed in a limiting sense. The scope of the present disclosure is limited only by the language of the following claims.

What is claimed is:

1. A method of address-based filtering for load/store speculation, the method comprising:
   in response to determining that a physical address has not been previously generated for an instruction that is dependent upon an ordering check triggering transaction, bypassing a lookup operation in an ordering violation memory structure, the lookup operation to determine whether the instruction dependent upon the ordering check triggering transaction is currently in-flight.

2. The method of claim 1, further comprising:
   in response to determining that a physical address has previously been generated for an instruction that is dependent on an ordering check triggering, performing a lookup operation in an ordering violation memory structure to determine whether the instruction dependent upon the ordering check triggering transaction is currently in-flight.

3. The method of claim 1, further comprising maintaining a filtering table comprising table entries for ranges of addresses including:
   detecting that a dependent instruction has generated a physical address; and
   indicating, in an entry of filtering table associated with a target address of the dependent instruction, that the dependent instruction generated the physical address.

4. The method of claim 3, wherein maintaining the filtering table comprising table entries associated with ranges of addresses comprises shifting the table entries in the filtering table in response to detecting that a particular slot has been reused in a queue deallocated in program order.

5. The method of claim 4, wherein the queue deallocated in program order is one selected from a group consisting of a store queue and a load tracking queue.

6. The method of claim 3, wherein maintaining the filtering table comprising table entries associated with ranges of addresses comprises shifting the table entries in the filtering table in response to detecting a reuse of a pre-selected reorder buffer ID.

7. The method of claim 3, wherein the filtering table comprises a plurality of separate tables.

8. The method of claim 1, wherein:
   the ordering check triggering transaction is a load instruction,
   receiving the ordering check triggering transaction comprises detecting that the load instruction has been generated a physical address, and the method further comprises:
   querying a filtering table using a target address of the ordering check triggering transaction to determine if an instruction dependent upon the ordering check triggering transaction has previously been generated a physical address comprises querying the filtering table using the target address of the load instruction to determine if a store instruction has previously been generated a physical address,
   determining that the filtering table lacks an indication that the instruction dependent upon the ordering check triggering transaction has previously been generated a physical address comprises determining that the filtering table lacks an indication that the store instruction has previously been generated a physical address, and
   bypassing a lookup operation in an ordering violation memory structure to determine whether the instruction dependent upon the ordering check triggering transaction is currently in-flight comprises bypassing the lookup operation in a store-to-load forwarding memory structure to determine whether the store instruction is currently in-flight.

9. The method of claim 1, wherein:
the ordering check triggering transaction is a store instruction,
receiving the ordering check triggering transaction comprises detecting that the store instruction has been generated a physical address, and the method further comprises:
querying a filtering table using a target address of the ordering check triggering transaction to determine if an instruction dependent upon the ordering check triggering transaction has previously been generated a physical address comprises querying the filtering table using the target address of the store instruction to determine if a load instruction has previously been generated a physical address,
determining that the filtering table lacks an indication that the instruction dependent upon the ordering check triggering transaction has previously been generated a physical address comprises determining that the filtering table lacks an indication that the load instruction has previously been generated a physical address, and
bypassing a lookup operation in an ordering violation memory structure to determine whether the instruction dependent upon the ordering check triggering transaction is currently in-flight comprises bypassing the lookup operation in an out-of-order buffer memory structure to determine whether the load instruction is currently in-flight.

10. The method of claim 1, wherein:
the ordering check triggering transaction is a cache event,
receiving the ordering check triggering transaction comprises detecting that the cache event has been generated a physical address, and the method further comprises:
querying a filtering table using a target address of the ordering check triggering transaction to determine if an instruction dependent upon the ordering check triggering transaction has previously been generated a physical address comprises querying the filtering table using the target address of the cache event to determine if a load instruction has previously been generated a physical address,
determining that the filtering table lacks an indication that the instruction dependent upon the ordering check triggering transaction has previously been generated a physical address comprises determining that the filtering table lacks an indication that the load instruction has previously been generated a physical address, and
bypassing a lookup operation in an ordering violation memory structure to determine whether the instruction dependent upon the ordering check triggering transaction is currently in-flight comprises bypassing the lookup operation in a load order queue memory structure to determine whether the load instruction is currently in-flight.

11. A processor comprising:
a load store unit comprising control logic configured to:
bypass a lookup operation in an ordering violation memory structure in response to determining that a physical address has not been previously generated for an instruction that is dependent upon an ordering check triggering transaction, the lookup operation to determine whether the instruction dependent upon the ordering check triggering transaction is currently in-flight.

12. The processor of claim 11, wherein the control logic is further configured to:
in response to determining that a physical address has previously been generated for an instruction that is dependent on an ordering check triggering, perform a lookup operation in an ordering violation memory structure to determine whether the instruction dependent upon the ordering check triggering transaction is currently in-flight.

13. The processor of claim 11, wherein the control logic is further configured to:
detect that a dependent instruction has generated a physical address; and
indicate, in an entry of filtering table associated with a target address of the dependent instruction, that the dependent instruction generated the physical address.

14. The processor of claim 11, wherein the load store unit further comprises a filtering table comprising table entries for ranges of addresses, wherein the control logic is further configured to:
maintain the filtering table; and
shift the table entries in the filtering table in response to detecting that a particular slot has been reused in a queue deallocated in program order.

15. The processor of claim 14, wherein the queue deallocated in program order is one selected from a group consisting of a store queue and a load tracking queue.

16. The processor of claim 14, wherein the control logic is further configured to:
shift the table entries in the filtering table in response to detecting a reuse of a pre-selected reorder buffer ID.

17. The processor of claim 14, wherein the filtering table comprises a plurality of separate tables.

18. The processor of claim 14, wherein the ordering check triggering transaction is a load instruction, receiving the ordering check triggering transaction comprises detecting that the load instruction has been generated a physical address, and the control logic is further configured to:
query the filtering table using a target address of the load instruction to determine if a store instruction has previously been generated a physical address;
determine that the filtering table lacks an indication that the store instruction has previously been generated a physical address; and
bypass the lookup operation in a store-to-load forwarding memory structure to determine whether the store instruction is currently in-flight.

19. The processor of claim 11, wherein the ordering check triggering transaction is a store instruction, receiving the ordering check triggering transaction comprises detecting that the store instruction has been generated a physical address, and the control logic is further configured to:
query a filtering table using a target address of the store instruction to determine if a load instruction has previously been generated a physical address;
determine that the filtering table lacks an indication that the load instruction has previously been generated a physical address; and
bypass the lookup operation in an out-of-order buffer memory structure to determine whether the load instruction is currently in-flight.

20. The processor of claim 11, wherein the ordering check triggering transaction is a cache event, receiving the ordering check triggering transaction comprises detecting that the cache event has been generated a physical address, and the control logic is further configured to:

query a filtering table using a target address of the cache event to determine if a load instruction has previously been generated a physical address;
determine that the filtering table lacks an indication that the load instruction has previously been generated a physical address; and
bypass the lookup operation in a load order queue memory structure to determine whether the load instruction is currently in-flight.

* * * * *